United States Patent
Hess

(10) Patent No.: US 11,858,096 B1
(45) Date of Patent: Jan. 2, 2024

(54) METHODS FOR ACHIEVING A TARGET JOINT PRELOAD

(71) Applicant: UNIVERSITY OF SOUTH FLORIDA, Tampa, FL (US)

(72) Inventor: Daniel P. Hess, Lutz, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 508 days.

(21) Appl. No.: 16/911,599

(22) Filed: Jun. 25, 2020

(51) Int. Cl.
- *G01L 5/24* (2006.01)
- *B25B 23/147* (2006.01)

(52) U.S. Cl.
CPC ............ *B25B 23/147* (2013.01); *G01L 5/24* (2013.01)

(58) Field of Classification Search
CPC ................................ B25B 23/147; G01L 5/24
See application file for complete search history.

(56) References Cited

U.S. PATENT DOCUMENTS

| | | | |
|---|---|---|---|
| 4,310,964 | A | 1/1982 | Murphy |
| 4,517,821 | A | 5/1985 | Taggart |
| 5,457,866 | A | 10/1995 | Noda |
| 6,276,243 | B1 | 8/2001 | Jenkins |

FOREIGN PATENT DOCUMENTS

| | | | |
|---|---|---|---|
| GB | 2096361 A | 10/1982 | |
| WO | WO2007028218 A1 | 3/2007 | |
| WO | WO-2020030384 A1 * | 2/2020 | ............ F16B 1/0014 |

OTHER PUBLICATIONS

Hagiwara, et al. "A new tightening technique for threaded fasteners", ASME 64 vol. 116, May 1994.

* cited by examiner

*Primary Examiner* — Rick K Chang
(74) *Attorney, Agent, or Firm* — Quarles & Brady LLP

(57) ABSTRACT

A method for achieving a target joint preload includes identifying a thread pitch of a first fastener element used to secure two components together. The first fastener element is passed through the two components and a second fastener element is threaded onto the first fastener element. A tightening torque is applied to the second fastener element, which is measured as the trial tightening torque. A loosening torque is applied to the second fastener element, which is measured as the trial removal torque. A required tightening torque that is required to be applied to the second fastener element to achieve the target joint preload is calculated using only the thread pitch, the trial tightening torque, the trial removal torque, and the target joint preload.

9 Claims, 6 Drawing Sheets

METHODS FOR ACHIEVING A TARGET JOINT PRELOAD

BACKGROUND

Threaded fasteners continue to find widespread use in structures, machinery, and mechanisms. In many cases, their function is to provide preload within a joint. The most common method for introducing preload in a bolted joint is through control (i.e., application and measurement) of tightening torque applied to the fasteners with a torque wrench. However, using tightening torque control to achieve preload comes with significant uncertainty in achieving a desired or target preload. This uncertainty in preload is typically specified as +/−35% for unlubricated fasteners and +/−25% for lubricated fasteners or determined from torque-tension data.

In a given application, a designer specifies a tightening torque to achieve a desired preload within a range dictated by this uncertainty. Although this method is relatively easy to implement, it has significant uncertainty. Even with torque-tension test data for specific fasteners, joints, and conditions, there is significant uncertainty due to differences in actual and test fasteners, including geometrical and frictional (from differences in surface, coating and lubricant conditions), tools, technique, and technicians.

From the above facts, it can be appreciated that it would be desirable to have a means to determine what tightening torque to apply to a fastener to achieve a target preload that is both simple to perform and without significant uncertainty.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

Figure 1:
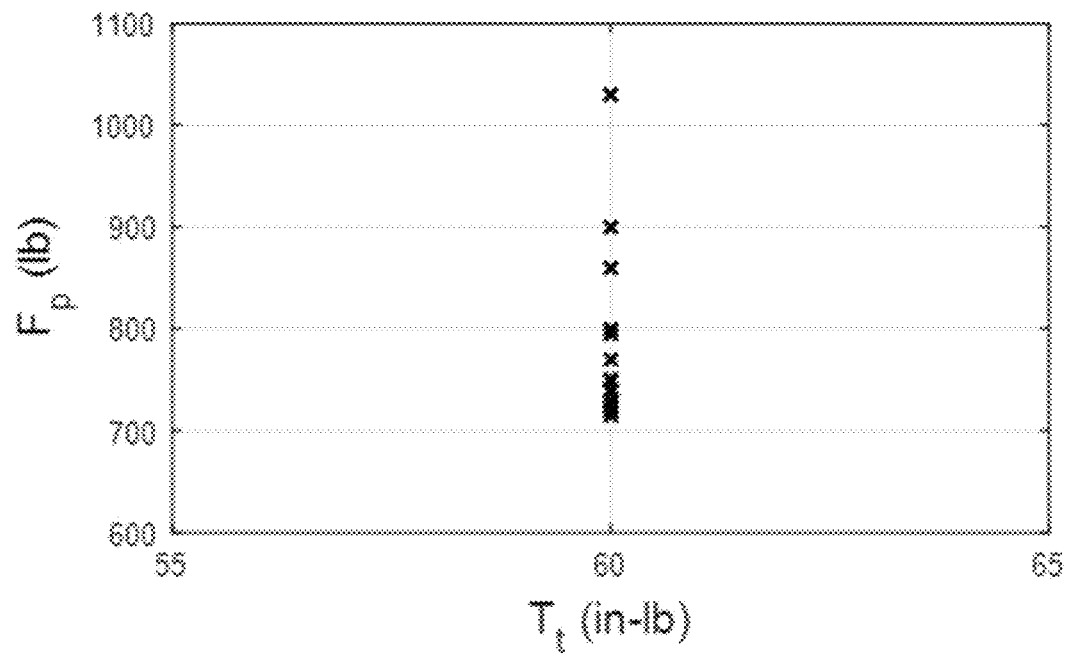
FIG. 1 shows preload versus tightening torque for AN4C14A bolt with AN315C4R full hex nut tests.

In the following disclosure, various specific embodiments are described. It is to be understood that those embodiments are example implementations of the disclosed inventions and that alternative embodiments are possible. Such alternative embodiments include hybrid embodiments that include features from different disclosed embodiments. All such embodiments are intended to fall within the scope of this disclosure.

Definitions

The following terms, as used in this disclosure, have the following definitions:

"Preload": The tensile force in a threaded fastener and the equivalent compressive force in the joint members when there is no applied load.

"Tightening torque": The torque applied with a torque tool to a threaded fastener to achieve preload in a bolted joint. The tightening torque is the amount of torque required to overcome thread and nut friction plus the torque required to stretch the bolt to achieve preload.

"Removal torque": The torque applied with a torque tool to initiate removal or disassembly of a threaded fastener in a bolted joint. The removal torque is the amount of torque required to overcome thread and nut friction minus the torque from bolt stretch.

"Torque difference": The difference between an applied tightening torque and an applied removal torque.

"Retightening torque": The torque applied with a torque tool to a threaded fastener to achieve preload in a bolted joint after the tightening torque and the removal torque have been applied to the fastener. Retightening torque is the amount of torque required to overcome thread and nut friction plus the torque required to stretch the bolt to achieve preload after the tightening torque and the removal torque have been applied to the fastener.

"Torque tool": A device, including torque wrenches, that are configured to apply and measure torque to a threaded fastener.

INTRODUCTION

Nominal preload, $F_p$, is defined in terms of the installation tightening torque, $T_t$, as $$F_p = \frac{T_t}{kD} \tag{1}$$

In this equation, k is the nut factor determined from torque-tension data and D is the nominal bolt diameter. The minimum and maximum preload are determined from the nominal preload, $F_p$, and the uncertainty, $\Gamma$, $$F_{p\ min} = (1-\Gamma)F_p$$

$$F_{p\ max} = (1+\Gamma)F_p \tag{2}$$

The uncertainty as to the preload is typically specified as +/−35% for unlubricated fasteners and +/−25% for lubricated fasteners, or is determined from torque-tension data. Equations for minimum and maximum preload often include additional parameters to account for preload variation due to relaxation, creep, and temperature change.

As an example, assume a designer specifies a tightening torque of 60 in-lb for fasteners without lubricant to achieve a nominal preload of 900 lb with an uncertainty of +/−35%. This means that a tightening torque of 60 in-lb will provide a preload between the minimum preload of 585 lb (i.e., 900 minus 35%) and the maximum preload of 1,215 lb (900 plus 35%). As part of the design process, one must check that the minimum preload is sufficient to hold the joint together and that the maximum preload is not so large as to damage the fasteners or joint. This example illustrates why some designers use a nominal preload of 65% of the yield strength of the bolt. Specifically, the maximum preload from nominal preload plus 35% uncertainty is at 100% yield strength of the bolt.

Less common methods to achieve preload are based on control of turn-angle or bolt stretch. These methods provide reduced uncertainty, but require the use of less common and more expensive equipment than a typical torque wrench, as well as additional training, technique, and preparation. The uncertainty in preload when using turn-angle measurement for preload is specified as +/−25% or as determined from turn-angle testing of sample hardware and statistical analysis.

Bolt-stretch measurement is performed using special calipers or micrometers, ultrasound equipment, or strain gages. Each of these devices requires additional preparation of the fasteners, such as machining bolt ends or strain gauge attachment and instrumentation. The uncertainty in preload when using the bolt-stretch measurement for preload is specified as +/−10% or as determined from testing of sample hardware and statistical analysis.

Of the three methods described above, tightening torque has the advantage of only requiring common tools, techniques, and training to implement, but has the highest uncertainty. While the turn-angle and bolt-stretch methods provide reduced uncertainty, they are generally more expensive and require additional tools, preparation, techniques, and training.

Disclosed in this application is a novel approach to achieving a desired preload. Instead of using tightening torque alone with existing torque-tension data to achieve preload, the disclosed approach uses thread pitch along with tightening torque and removal torque measurements at the time of installation as preload is proportional to the tightening torque minus the removal torque. Accordingly, no existing torque-tension data is needed in the disclosed approach. Instead, the approach is based on simple torque equations. These equations and test data are provided below. The test data establishes that the disclosed approach produces results with less uncertainty as compared to using tightening torque alone.

Determining Preload from Thread Pitch and Torque Difference

The tightening torque for a threaded fastener in a bolted joint can be mathematically defined as $$T_t = F_p\left(\frac{p}{2\pi} + \frac{\mu_t r_t}{\cos\beta} + \mu_n r_n\right) \tag{3}$$

In this equation, $T_t$ is the tightening torque, $F_p$ is the preload, $p$ is the thread pitch, $\mu_t$ is the thread interface friction coefficient, $r_t$ is the nominal thread interface radius, $\beta$ is the thread half angle, $\mu_n$ is the nut face friction coefficient, and $r_n$ is the nominal nut face radius. The first term in the parentheses of the equation is the torque required to stretch the bolt, and the remaining two terms are the torque required to overcome thread and nut friction, respectively.

Using torque-tension data, tightening torque is typically specified and applied with a torque wrench to achieve desired preload. Equation 3 provides a relation between preload and tightening torque. The two coefficients of friction are the most difficult to estimate. Friction introduces the most uncertainty in this relation and in torque-tension data. In practice, this translates to uncertainty in preload for a specified tightening torque.

Similarly, the removal torque for a threaded fastener in a bolted joint can be mathematically defined as $$T_r = F_p\left(-\frac{p}{2\pi} + \frac{\mu_t r_t}{\cos\beta} + \mu_n r_n\right) \tag{4}$$

This removal torque is the torque required to overcome thread and nut friction minus the torque from bolt stretch and, therefore, is the torque applied with a torque wrench or other torque tool to initiate removal or disassembly of a threaded fastener in a bolted joint.

A relation between preload and tightening torque minus removal torque is defined by subtracting Equation 4 from Equation 3 and solving for preload $$F_p = \frac{\pi}{p}(T_t - T_r) \tag{5}$$

This result reveals that preload can be determined from thread pitch, tightening torque, and removal torque alone. In other words, preload can be determined given nothing more than the know thread pitch and a torque tool.

For threaded fasteners with a prevailing torque locking feature (e.g., lock nuts and locking inserts), the tightening torque and removal torque equations become $$T_t = F_p\left(\frac{p}{2\pi} + \frac{\mu_t r_t}{\cos\beta} + \mu_n r_n\right) + T_{pv} \tag{6}$$

and $$T_r = F_p\left(-\frac{p}{2\pi} + \frac{\mu_t r_t}{\cos\beta} + \mu_n r_n\right) + T_{pv} \tag{7}$$

In these equations, $T_{pv}$ is the prevailing torque, which is independent of preload $F_p$ and adds to both the tightening torque and removal torque.

As before, the equation for preload is determined by subtracting removal torque, (Eq. 7), from tightening torque (Eq. 6), and solving for preload to obtain Equation 5. Preload, in terms of tightening torque minus removal torque, is independent of the prevailing torque, provided that the prevailing torque is the same in both directions.

Determining Self-Loosening and Primary Locking

The negative term in the removal torque equation defines the inherent self-loosening of a fastener. Such self-loosening results from the bolt-stretch torque and the associated potential energy within the bolt. The bolt-stretch technique is inherent to the threaded fastener and is proportional to preload and thread pitch. Self-loosening can be defined in terms of tightening torque and removal torque by subtracting Equation 4 from Equation 3 and dividing by 2

$$\frac{F_p p}{2\pi} = \frac{1}{2}(T_t - T_r) \quad (8)$$

The significance of this equation is that self-loosening can be quantified using measurements of tightening torque and removal torque, instead of requiring a measurement of preload. This equation for self-loosening also applies to fasteners with prevailing torque locking, as shown by subtracting Equation 7 from Equation 6 and dividing by 2.

The friction terms in the tightening torque and removal torque equations define the primary locking in a bolted joint. This primary locking is dependent on preload and friction. The primary locking is defined in terms of tightening torque and removal torque by adding Equations 3 and 4 and dividing by 2

$$F_p \left( \frac{\mu_t r_t}{\cos \beta} + \mu_n r_n \right) = \frac{1}{2}(T_t + T_r) \quad (9)$$

The significance of the above equation is that primary locking can be quantified using measurements of tightening torque and removal torque, instead of requiring estimates of thread interface and nut face coefficients of friction.

For threaded fasteners with a prevailing torque locking feature, such as a locking nut, the primary locking is determined by adding Equations 6 and 7 and solving for primary locking $$F_p \left( \frac{u_t r_t}{\cos \beta} + \mu_n r_n \right) = \frac{1}{2}(T_t + T_r) - T_{pv} \quad (10)$$

This equation reveals that, even with a prevailing torque locking feature, the primary locking can be quantified with measurements of tightening, removal, and prevailing torque.

Uncertainty

Existing methods of using tightening torque control to achieve preload are frequently used but result in significant uncertainty in preload. A primary source for this uncertainty is from thread-interface friction and nut-face friction (or bolt-face friction when using inserts). Uncertainty exists within test samples in torque-tension tests due to variations in test fasteners and interface conditions. Additional variation, not only in fastener and interface conditions but also in tools, technique, and technician, is introduced for actual fastener hardware used at installation compared to samples used in torque-tension testing. Existing methods also require previously obtained torque-tension data to specify tightening torque at installation and a specification or previous data for uncertainty.

The disclosed approach, on the other hand, uses both tightening torque and removal torque to determine preload. Preload is determined from the thread pitch, the tightening torque, and the removal torque measured at installation. No previous torque-tension data is needed for a nut factor to relate tightening torque to preload. Preload can be determined given nothing more than thread pitch and a torque tool to measure tightening torque and removal torque at installation.

Since preload is determined by subtracting removal torque from tightening torque, the thread interface friction and nut face friction are canceled out, as is apparent from Equations 3 to 5. However, subtracting quantities with uncertainty does not usually subtract out the uncertainty. Regardless, uncertainty in preload from torque difference (i.e., tightening minus removal torque) is expected to be less than the uncertainty in preload from tightening torque for two reasons, which are described below.

First, preload from tightening torque alone is based on torque-tension data previously obtained with representative sample fasteners and interface conditions using a different technician, tools, and possibly technique than used at installation. Uncertainty results from reproducibility within these previously tested sample fasteners as well as the actual fastener at installation. Preload from torque difference as described herein requires no previous data. Instead, preload is determined based on torque measurements at installation for the actual fastener, interface conditions (including the state of coatings, cleanliness, and lubricant), technician, technique, and tools. Uncertainty results from repeatability (i.e., more than one torque measurement on the actual fastener) rather than reproducibility.

Second, torque wrench accuracy and repeatability are relevant for preload from torque, whereas only torque wrench repeatability is relevant for preload from torque difference. Calibration certificate data generally show accuracy of 2 to 4% compared to repeatability of less than 1%.

Testing

Testing was performed to confirm the above-described relationship between preload and thread pitch, tightening torque, and removal torque. The fasteners used in this testing included cadmium plated AN4-14A bolts (0.25-28, 1.53" long), AN315-4 full hex nuts, AN365-428A elastic stop lock nuts, AN363-428 all-metal lock nuts, and AN960-416 washers, as well as stainless steel AN4C14A bolts, AN315C4R full hex nuts, AN363C428 all-metal lock nuts, and AN960C416 washers.

Test equipment and a fixture were assembled for tests to be performed with a bolt and a nut. A washer was used under both the bolt head and the nut. The fixture integrated a strain gage through-hole load cell for preload measurement. The load cell was rated for 2,000 lb and had a height of 0.63", an outer diameter of 2.0", and a loading diameter of 0.88". The accuracy was within 1% and repeatability is within +/−0.1% full scale. The fixture included a cone-shaped component made of A286 steel that was 0.50" tall with a 1.1" top outer diameter, a 2.1" bottom outer diameter, and a clearance hole for 0.25-28 bolt. Tests with stainless steel Helicoil 1191-4CN375 nonlocking inserts and 3591-4CN375 locking inserts were performed with both AN4-14A and AN4C14A bolts. The fixture also included an additional cylindrical bottom component made of A286 steel that was 1.1" tall with a 1.3" outer diameter. The bottom component was drilled and tapped for 0.25-28 Helicoil insert installation. A washer was used under the bolt head.

Tightening torque and removal torque were measured with a dial-type torque wrench. The torque wrench range was 15-75 in-lb (20-100% full scale) in increments of 1 in-lb. The accuracy was within +/−4% of torque reading in both directions, however, the actual repeatability from certificate of calibration was within +1-1% of torque reading in both directions. For example, the repeatability at 60 in-lb was within +/−0.6 in-lb. For purposes of these tests, repeatability is more relevant than accuracy because torque difference instead of absolute torque is used to determine preload.

A dial-type torque wrench with a range of 6-30 in-lb (20-100% full scale) in increments of 0.5 in-lb was used for measuring prevailing torque in tests with lock nuts and locking inserts. The accuracy was +/−4% and repeatability was within +/−1% of torque reading in both directions.

All tests were performed with fasteners in their as-received condition. In other words, the fasteners were removed from manufacturer packaging and used without solvent cleaning or the addition of lubricant. Since the recommended range for tightening torque of AN-4 bolts is 50-70 in-lb, each of the test fasteners were assembled using a tightening torque of 60 in-lb plus any measured prevailing torque for lock nuts or locking inserts.

Bolt with Nut Test Data

Table 1 presents sample data from tests with an AN4C14A bolt and an AN315C4R full hex nut having known thread pitches. Each row in the table shows measured data and calculations for a test. For each test, a tightening torque of 60 in-lb was first applied to the nut and the resulting preload was measured from the load cell. Then, a removal torque was applied to the nut in the opposite direction and measured. The preload was calculated based upon the torque difference (i.e., tightening torque minus removal torque) according to Equation 5 and the percent difference between the measured and computed preload was calculated. Self-loosening was calculated using Equation 8, first from measured preload and then from measured torque difference. Finally, the primary locking was calculated from the torque sum using Equation 9. This was performed for a total of 20 (1 initial use and 19 reuse) tests for the same bolt and nut. While the nut was not removed between tests, the measured preload was reduced to zero before each reuse.

TABLE 1

Measurements and calculations for AN4C14A bolt with AN315C4R full hex nut.

| Measurements | | | $\pi(T_t - T_r)/$ | | $F_p p/$ | $(T_t - T_r)/$ | $(T_t + T_r)/$ |
|---|---|---|---|---|---|---|---|
| $T_t$ (in-lb) | $F_p$ (lb) | $T_r$ (in-lb) | p (lb) | % diff | $2\pi$ (in-lb) | 2 (in-lb) | 2 (in-lb) |
| 60 | 1030 | 49 | 968 | 6.1 | 5.9 | 5.5 | 54.5 |
| 60 | 900 | 51 | 792 | 12.0 | 5.1 | 4.5 | 55.5 |
| 60 | 860 | 51 | 792 | 7.9 | 4.9 | 4.5 | 55.5 |
| 60 | 800 | 50 | 880 | −10.0 | 4.5 | 5.0 | 55.0 |
| 60 | 795 | 51 | 792 | 0.4 | 4.5 | 4.5 | 55.5 |
| 60 | 750 | 52 | 704 | 6.2 | 4.3 | 4.0 | 56.0 |
| 60 | 740 | 51 | 792 | −7.0 | 4.2 | 4.5 | 55.5 |
| 60 | 770 | 52 | 704 | 8.6 | 4.4 | 4.0 | 56.0 |
| 60 | 750 | 52 | 704 | 6.2 | 4.3 | 4.0 | 56.0 |
| 60 | 740 | 52 | 704 | 4.9 | 4.2 | 4.0 | 56.0 |
| 60 | 750 | 52 | 704 | 6.2 | 4.3 | 4.0 | 56.0 |
| 60 | 740 | 51 | 792 | −7.0 | 4.2 | 4.5 | 55.5 |
| 60 | 730 | 51 | 792 | −8.4 | 4.1 | 4.5 | 55.5 |
| 60 | 720 | 51 | 792 | −10.0 | 4.1 | 4.5 | 55.5 |
| 60 | 740 | 51 | 792 | −7.0 | 4.2 | 4.5 | 55.5 |
| 60 | 725 | 52 | 704 | 2.9 | 4.1 | 4.0 | 56.0 |
| 60 | 720 | 51 | 792 | −10.0 | 4.1 | 4.5 | 55.5 |
| 60 | 730 | 52 | 704 | 3.6 | 4.1 | 4.0 | 56.0 |
| 60 | 715 | 52 | 704 | 1.6 | 4.1 | 4.0 | 56.0 |
| 60 | 725 | 52 | 704 | 2.9 | 4.1 | 4.0 | 56.0 |

The data of Table 1 reveals that the preload drops with reuse even with the same tightening torque. This is due to an increase in friction at the thread interface and nut face with reuse. This is supported by the computed increase in primary locking with reuse and was not unexpected since the fasteners used are as-received with no added lubricant.

The self-loosening computed using the measured preload compares well with the self-loosening computed using the torque difference, even with significant reuse. This is evidence of the validity of the disclosed concept of using one-half the tightening minus removal torque for determining self-loosening.

Figure 2:
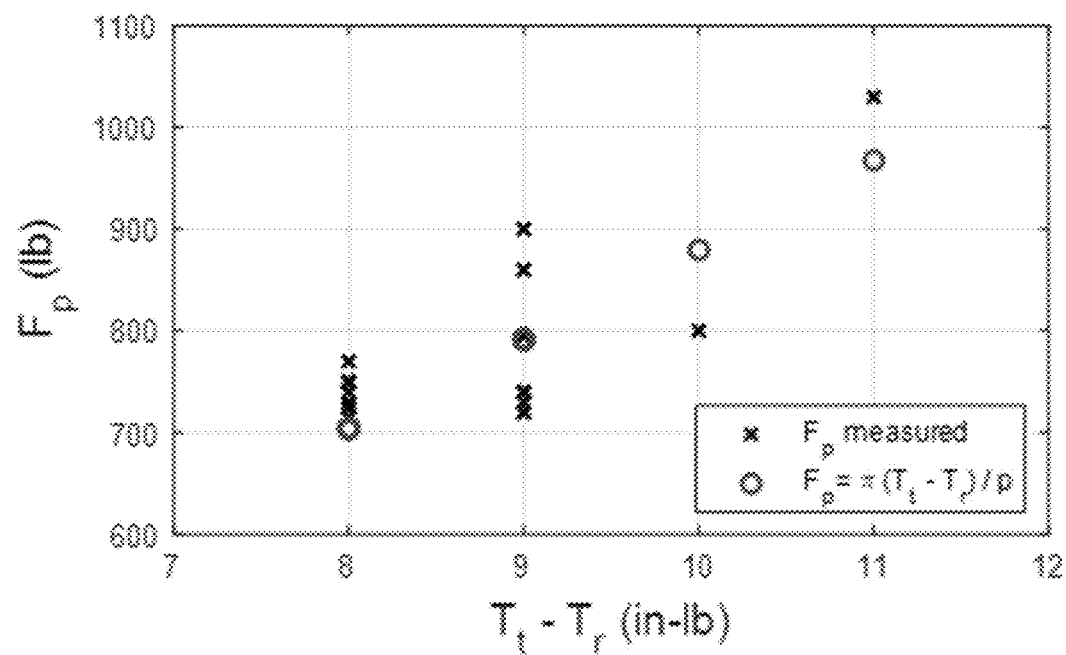
FIG. 2 shows preload versus tightening minus removal torque for AN4C14A bolt with AN315C4R full hex nut tests.

The preload determined using the thread pitch and torque difference compares well with the measured preload with a maximum percent difference of 12%. It is noted that, even though the applied tightening torque was constant at 60 in-lb, the measured removal torque increased with reuse and the corresponding computed preload decreased with reuse. FIG. 1 plots the measured preload against tightening torque for all 20 tests. As shown in this figure, the spread in measured preload with tightening torque was 315 lb. FIG. 2 plots the measured and computed preload against the applied tightening torque minus removal torque for all 20 tests. The spread in the measured preload for a given torque difference was less than the spread in measured preload with tightening torque alone. Furthermore, the difference between measured preload and computed preload in FIG. 2 was much less than the spread in measured preload with tightening torque in FIG. 1. This is also evidence of the validity of the concept of using of thread pitch and torque difference for calculating preload as defined in Equation 5.

One issue with the disclosed approach is that the process of measuring removal torque removes preload. The solution to this issue is to retighten the nut to the tightening torque. Therefore, the process required to use tightening torque and removal torque to determine preload can include retightening of the nut to the tightening torque.

Table 2 presents sample data that includes retightening to the tightening torque and measuring preload after this retightening. The process of tightening, removing the applied torque, and retightening was performed 19 times with the same bolt and nut. Each row in Table 2 presents these torque measurements, the preload measurement after retightening, and calculations of preload, percent difference, self-loosening, and primary locking for the process. The percent difference shown in the table is the difference between the measured preload after retightening and the computed preload from the torque difference.

TABLE 2

Measurements and calculations for AN4C14A bolt with AN315C4R full hex nut with retightening.

| Measurements | | | | Calculations | | | |
|---|---|---|---|---|---|---|---|
| $T_t$ (in-lb) | $T_r$ (in-lb) | $T_t$ (in-lb) | $F_p$ (lb) | $\pi(T_t - T_r)/$ p (lb) | % diff | $F_p p/$ $2\pi$ (in-lb) | $(T_t - T_r)/$ 2 (in-lb) | $(T_t + T_r)/$ 2 (in-lb) |
| 60 | 49 | 60 | 900 | 968 | −7.5 | 5.1 | 5.5 | 54.5 |
| 60 | 51 | 60 | 860 | 792 | 7.9 | 4.9 | 4.5 | 55.5 |
| 60 | 51 | 60 | 800 | 792 | 1.0 | 4.5 | 4.5 | 55.5 |
| 60 | 50 | 60 | 795 | 880 | −10.6 | 4.5 | 5.0 | 55.0 |
| 60 | 51 | 60 | 750 | 792 | −5.6 | 4.3 | 4.5 | 55.5 |
| 60 | 52 | 60 | 740 | 704 | 4.9 | 4.2 | 4.0 | 56.0 |
| 60 | 51 | 60 | 770 | 792 | −2.8 | 4.4 | 4.5 | 55.5 |
| 60 | 52 | 60 | 750 | 704 | 6.2 | 4.3 | 4.0 | 56.0 |
| 60 | 52 | 60 | 740 | 704 | 4.9 | 4.2 | 4.0 | 56.0 |
| 60 | 52 | 60 | 750 | 704 | 6.2 | 4.3 | 4.0 | 56.0 |
| 60 | 52 | 60 | 740 | 704 | 4.9 | 4.2 | 4.0 | 56.0 |
| 60 | 51 | 60 | 730 | 792 | −8.4 | 4.1 | 4.5 | 55.5 |
| 60 | 51 | 60 | 720 | 792 | −10.0 | 4.1 | 4.5 | 55.5 |
| 60 | 51 | 60 | 740 | 792 | −7.0 | 4.2 | 4.5 | 55.5 |
| 60 | 51 | 60 | 725 | 792 | −9.2 | 4.1 | 4.5 | 55.5 |
| 60 | 52 | 60 | 720 | 704 | 2.3 | 4.1 | 4.0 | 56.0 |
| 60 | 51 | 60 | 730 | 792 | −8.4 | 4.1 | 4.5 | 55.5 |
| 60 | 52 | 60 | 715 | 704 | 1.6 | 4.1 | 4.0 | 56.0 |
| 60 | 52 | 60 | 725 | 704 | 2.9 | 4.1 | 4.0 | 56.0 |

Figure 3:
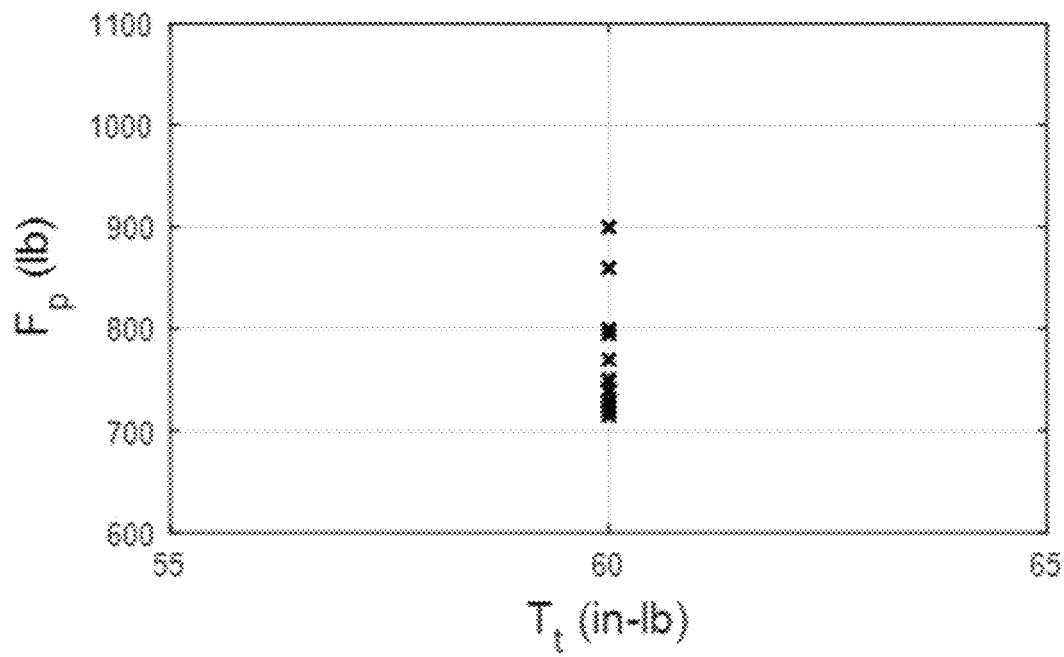
FIG. 3 Shows preload versus tightening torque for AN4C14A bolt with AN315C4R full hex nut tests using measured preload after retightening.
Figure 4:
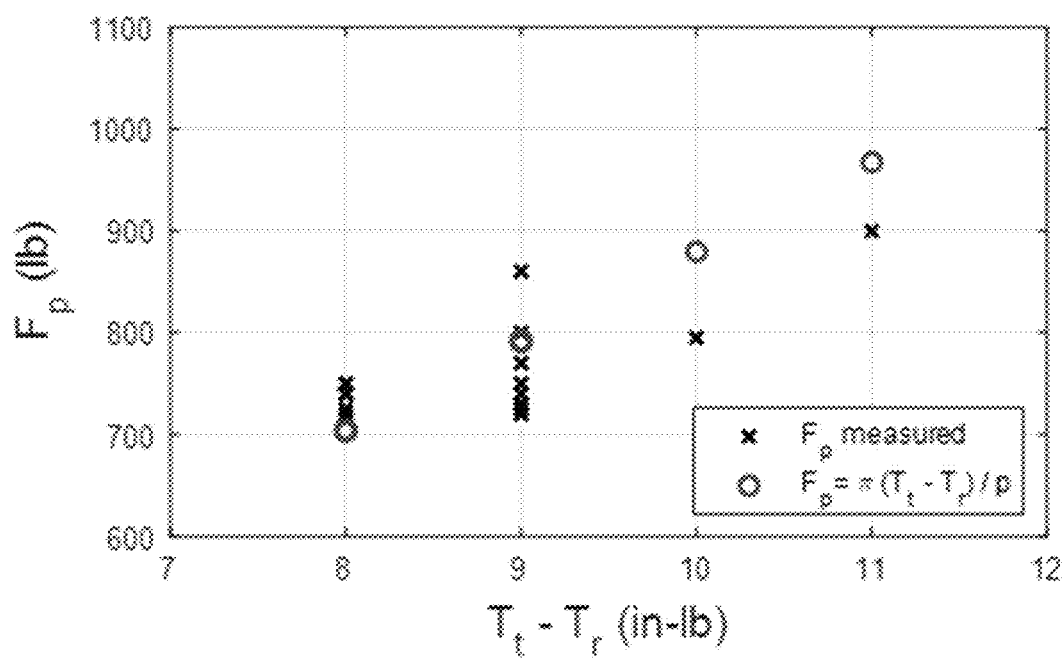
FIG. 4 shows preload versus tightening minus removal torque for AN4C14A bolt with AN315C4R full hex nut tests using measured preload after retightening.

The preload determined using the thread pitch and the torque difference compares well with the measured preload after retightening with a maximum percent difference of −10.6%. FIG. 3 plots the measured preload after retightening against the tightening torque for all 19 preload measurements. The spread in measured preload is 185 lb. FIG. 4 plots this measured preload and the corresponding computed preload against the tightening torque minus the removal torque. The difference between computed preload and measured preload after retightening shown in FIG. 4 is much less than the spread in measured preload after retightening with tightening torque shown in FIG. 3. This provides evidence of the validity of the concept of using thread pitch and measured tightening minus removal torque for calculating preload as defined in Equation 5 with retightening to tightening torque included in the process.

As an example of using this approach, consider a 0.25-28 bolt and nut installed with a torque wrench to a tightening torque of 60 in-lb. The torque wrench is used to measure the removal torque of 49 in-lb and then used to retighten to 60 in-lb. The preload is calculated using Equation 5

$$F_p = \frac{\pi}{p}(T_t - T_r) = \frac{\pi}{(1/28)}(60 - 49) = 968 \text{ lb}. \quad (11)$$

Since the data used in this example is from row 1 of Table 2, the measured preload from retightening is 900 lb. The percent difference between measured and computed preload is −7.5%. From Equation 8, the self-loosening computed from the measured torque difference compares well to the self-loosening computed from the measured preload after retightening.

$$\frac{1}{2}(T_t - T_r) = \frac{1}{2}(60 - 49) = 5.5 \text{ in·lb} \quad (12)$$

$$\frac{F_p p}{2\pi} = \frac{(900)(1/28)}{2\pi} = 5.1 \text{ in·lb}$$

From Equation 9, the primary locking is computed from the torque sum as $$F_p\left(\frac{\mu_t r_t}{\cos\beta} + \mu_n r_n\right) = \frac{1}{2}(T_t + T_r) = \frac{1}{2}(60 + 49) = 54.5 \text{ in·lb}. \quad (13)$$

Bolt with Lock Nut Test Data

Table 3 presents sample data from tests with an AN4-14A bolt and an AN365-428A elastic stop lock nut. In these tests, the 6-30 in-lb range torque wrench was used on the lock nut to measure the "on" prevailing torque in the tightening direction once the locking feature was fully engaged with zero preload. The 15-75 in-lb range torque wrench was then used on the lock nut to apply a tightening torque of 60 in-lb plus the measured prevailing torque. For example, if the measured prevailing torque was 15 in-lb, then the tightening torque would be 75 in-lb. Next, torque was applied to the lock nut in the opposite direction to measure the removal torque. The lock nut was turned until there was zero preload with full engagement of the locking feature, then the "off" prevailing torque was measured. The lock nut was retightened, the "on" prevailing torque was measured again, and then a tightening torque of 60 in-lb plus the prevailing torque was applied. The preload was measured with the load cell after retightening.

The process of tightening, loosening (i.e., applying a removal torque), and retightening was performed 11 times with the same bolt and lock nut. Each row in Table 3 presents torque measurements, preload measurements after retightening, and calculations of preload, percent difference, self-loosening, and primary locking for the process. The percent difference shown in the table is the difference between the measured preload after retightening and the computed preload from the torque difference.

TABLE 3

Measurements and calculations for AN4-14A bolt with AN365-428A lock nut.

| Measurements | | | | | | | Calculations | | | | |
|---|---|---|---|---|---|---|---|---|---|---|---|
| $T_{pv\,on}$ (in-lb) | $T_t$ (in-lb) | $T_r$ (in-lb) | $T_{pv\,off}$ (in-lb) | $T_{pv\,on}$ (in-lb) | $T_t$ (in-lb) | $F_p$ (lb) | $\pi(T_t - T_r)/p$ (lb) | % diff | $F_p p/2\pi$ (in-lb) | $(T_t - T_r)/2$ (in-lb) | $(T_t + T_r)/2 - T_{pv}$ (in-lb) |
| 15 | 75 | 64 | 12 | 14 | 74 | 979 | 880 | 10.1 | 5.6 | 5.0 | 55.0 |
| 14 | 74 | 62 | 12 | 13 | 73 | 940 | 968 | −2.9 | 5.3 | 5.5 | 54.5 |
| 13 | 73 | 63 | 12 | 12 | 72 | 893 | 792 | 11.3 | 5.1 | 4.5 | 55.5 |
| 12 | 72 | 62 | 12 | 12 | 72 | 852 | 880 | −3.2 | 4.8 | 5.0 | 55.0 |
| 12 | 72 | 62 | 12 | 12 | 72 | 850 | 880 | −3.5 | 4.8 | 5.0 | 55.0 |
| 12 | 72 | 63 | 12 | 13 | 73 | 809 | 880 | −8.7 | 4.6 | 5.0 | 55.0 |
| 13 | 73 | 63 | 13 | 12 | 72 | 824 | 792 | 3.9 | 4.7 | 4.5 | 55.5 |
| 12 | 72 | 63 | 12 | 12 | 72 | 751 | 792 | −5.4 | 4.3 | 4.5 | 55.5 |
| 12 | 72 | 64 | 12 | 12 | 72 | 736 | 704 | 4.4 | 4.2 | 4.0 | 56.0 |
| 12 | 72 | 64 | 12 | 12 | 72 | 667 | 704 | −5.5 | 3.8 | 4.0 | 56.0 |
| 12 | 72 | 64 | 12 | 12 | 72 | 681 | 704 | −3.3 | 3.9 | 4.0 | 56.0 |

This data shows a decrease in "on" prevailing torque with reuse. This is an expected result with lock nuts. The "off" prevailing torque is less than the "on" prevailing torque for the initial use and first couple reuses, but then is consistent in both directions. If these torques are significantly different in the two directions, adjustments should be made in calculating preload and self-loosening. The tightening torque was 60 in-lb plus the "on" prevailing torque. As with the previous data, the preload dropped with reuse due to an increase in friction at the thread interface and nut face, which is supported by the computed increase in primary locking with reuse. This was not unexpected since the fasteners are used as-received with no added lubricant.

The self-loosening computed with the disclosed torque difference compares well with the self-loosening computed with the measured preload after retightening. This is evidence that validates the concept of using the thread pitch and torque difference to determine self-loosening, even for a lock nut with reuse.

Figure 5:
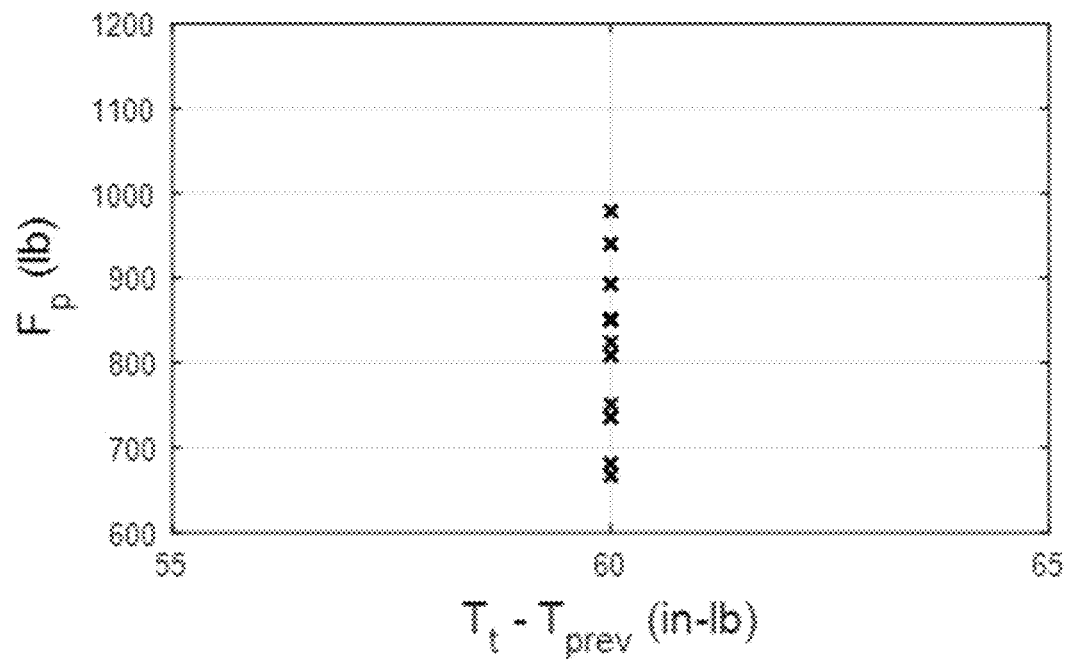
FIG. 5 shows preload versus tightening torque minus prevailing torque for AN4-14A bolt with AN365-428A lock nut tests.
Figure 6:
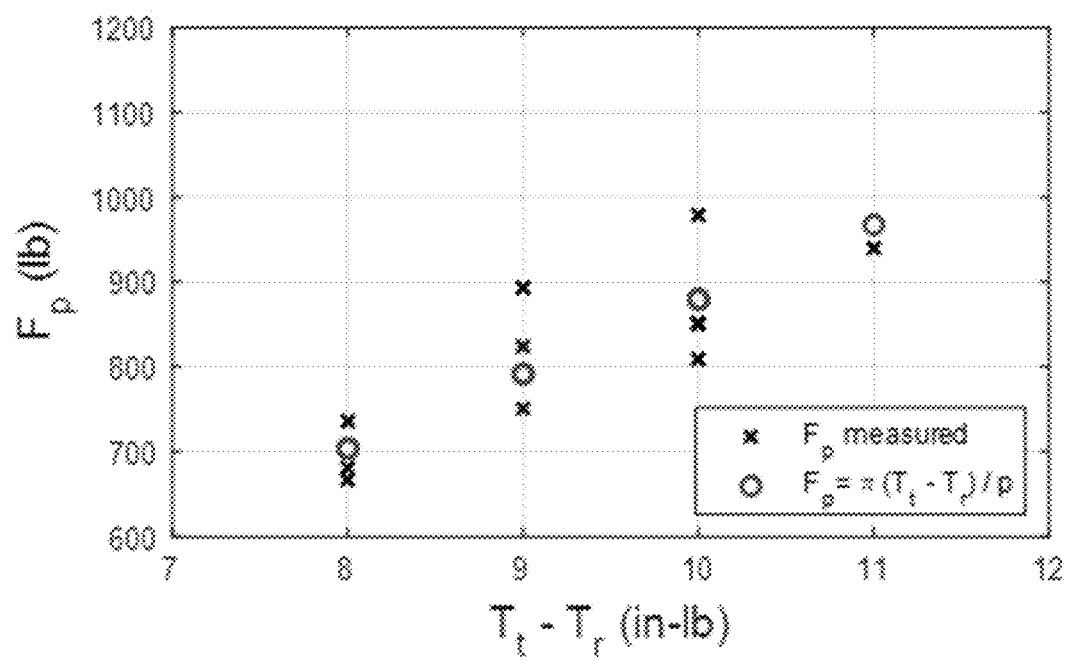
FIG. 6 shows preload versus tightening minus removal torque for AN4-14A bolt with AN365-428A lock nut tests.

The preload determined with the thread pitch and torque difference compares well with the measured preload after retightening with a maximum percent difference of 11.3%. FIG. 5 plots the measured preload after retightening against the tightening torque minus the prevailing torque. The spread in measured preload was 312 lb. FIG. 6 plots the corresponding measured and computed preload against the tightening torque minus removal torque. The difference between computed preload and measured preload after retightening in FIG. 6 is much less than the spread in measured preload with tightening torque minus prevailing torque in FIG. 5. This is still further evidence of the validity of the disclosed concept of calculating preload using thread pitch and torque difference, even for a lock nut with a prevailing torque locking feature and reuse.

Bolt with Locking Insert Test Data

Table 4 presents sample data from tests with an AN4-14A bolt and a 3591-4CN375 locking Helicoil insert. In these tests, the torque wrench was applied to the bolt head. As before, the lower range torque wrench was used to measure the prevailing torque in both the "on" and "off" directions under the conditions of a fully engaged locking feature and zero preload. The higher range torque wrench was used to apply a tightening and retightening torque of 60 in-lb plus the measured "on" prevailing torque and then was used to measure the removal torque. The preload after retightening was measured with the load cell.

Figure 7:
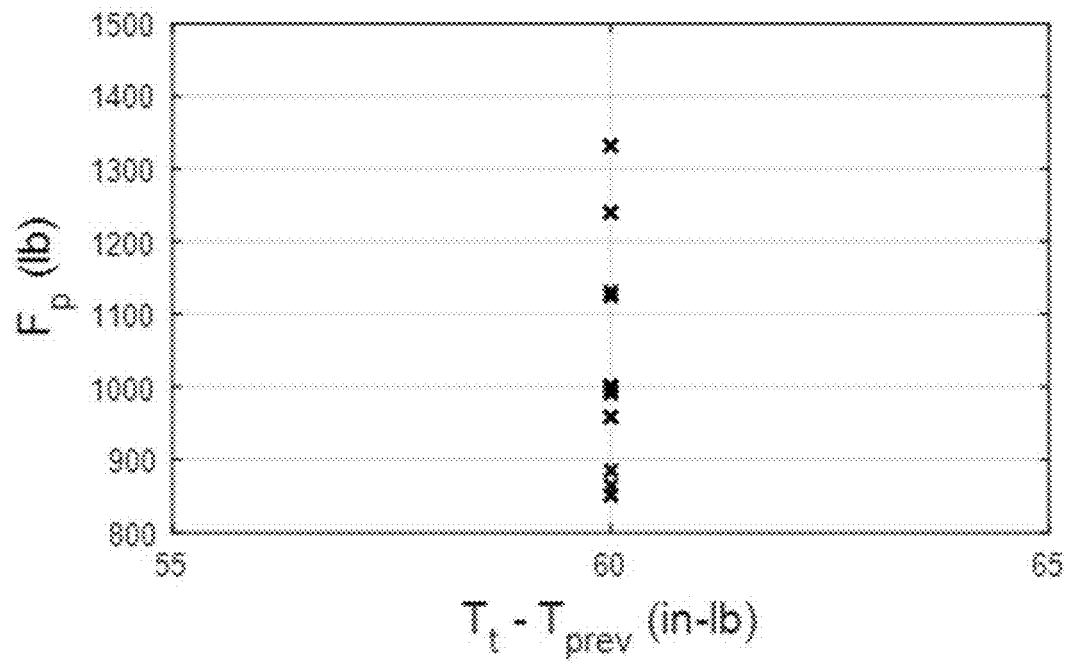
FIG. 7 shows preload versus tightening torque minus prevailing torque for AN4C14A bolt with 3591-4CN375 Helicoil insert tests.
Figure 8:
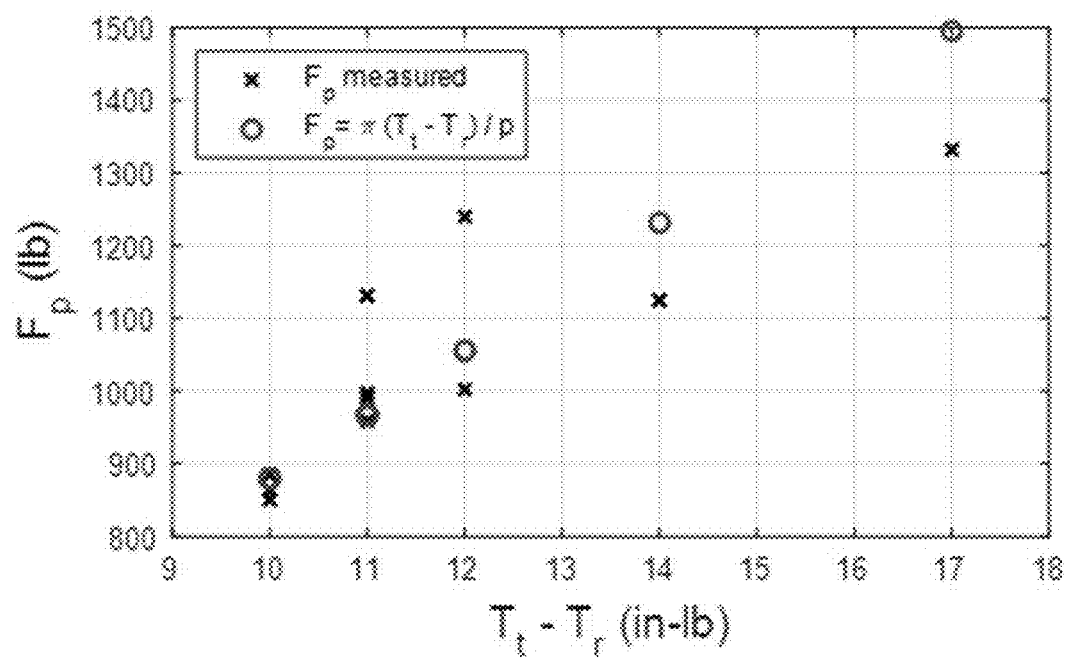
FIG. 8 shows preload versus tightening minus removal torque for AN4C14A bolt with 3591-4CN375 Helicoil insert tests.

The process of tightening, removing the tightening torque, and retightening was performed 11 times with the same bolt and locking insert. Each row in Table 4 presents the torque measurements, the preload measurement after retightening, and the calculations of the preload, percent difference, self-loosening, and primary locking for the process. The percent difference shown in the table is the difference between the measured preload after retightening and the computed preload from torque difference.

after retightening with a maximum percent difference of 14.9%. FIG. 7 plots measured preload after retightening against tightening torque minus prevailing torque. The spread in measured preload was 481 lb. FIG. 8 plots the measured and the computed preload against the tightening torque minus the removal torque. The difference between computed preload and measured preload after retightening shown in FIG. 8 is much less than the spread in measured preload in FIG. 7. This is evidence of the validity the disclosed concept of calculating preload with thread pitch and measured tightening minus removal torque, even for bolts with locking inserts and reuse.

As an example of using this approach with fasteners with a prevailing torque locking feature, consider a 0.25-28 bolt and a locking insert. The bolt is installed into the insert with torque wrenches with a measured "on" prevailing torque of 15 in-lb and tightening torque of 75 in-lb. Torque wrenches are used to measure a removal torque of 58 in-lb and an "off" prevailing torque of 15 in-lb. Then, the bolt is retightened with a measured "on" prevailing torque of 15 in-lb and tightening torque of 75 in-lb. The preload is then calculated using Equation 5

$$F_p = \frac{\pi}{p}(T_t - T_r) = \frac{\pi}{(1/28)}(75 - 58) + 1495 \text{ lb} \qquad (14)$$

Since the data used in this example is from row 1 of Table 4, the measured preload after retightening is 1,332 lb. The percent difference between the measured and the computed preload is −12.3%. From Equation 8, the self-loosening computed from the measured torque difference compares well to the self-loosening computed from the measured preload after retightening

TABLE 4

Tests and calculations for AN4C14A bolt with 3591-4CN375 Helicoil insert.

| Measurements | | | | | | | Calculations | | | | |
|---|---|---|---|---|---|---|---|---|---|---|---|
| $T_{pv\,on}$ (in-lb) | $T_t$ (in-lb) | $T_r$ (in-lb) | $T_{pv\,off}$ (in-lb) | $T_{pv\,off}$ (in-lb) | $T_t$ (in-lb) | $F_p$ (lb) | $\pi(T_t - T_r)/p$ (lb) | % diff | $F_p p/2\pi$ (in-lb) | $(T_t - T_r)/2$ (in-lb) | $(T_t + T_r)/2 - T_{pv}$ (in-lb) |
| 15 | 75 | 58 | 15 | 15 | 75 | 1332 | 1495 | −12.3 | 7.6 | 8.5 | 51.5 |
| 15 | 75 | 59 | 11 | 11 | 71 | 1240 | 1056 | 14.9 | 7.0 | 6.0 | 54.0 |
| 11 | 71 | 57 | 8 | 8 | 68 | 1131 | 968 | 14.4 | 6.4 | 5.5 | 54.5 |
| 8 | 68 | 54 | 8 | 8 | 68 | 1125 | 1232 | −9.5 | 6.4 | 7.0 | 53.0 |
| 8 | 68 | 54 | 6 | 6 | 66 | 1002 | 1056 | −5.3 | 5.7 | 6.0 | 54.0 |
| 6 | 66 | 55 | 6 | 6 | 66 | 991 | 968 | 2.4 | 5.6 | 5.5 | 54.5 |
| 6 | 66 | 55 | 6 | 6 | 66 | 997 | 968 | 2.9 | 5.7 | 5.5 | 54.5 |
| 6 | 66 | 55 | 6 | 6 | 66 | 959 | 968 | −0.9 | 5.5 | 5.5 | 54.5 |
| 6 | 66 | 55 | 6 | 6 | 65 | 885 | 880 | 0.6 | 5.0 | 5.0 | 54.5 |
| 6 | 65 | 55 | 6 | 6 | 65 | 864 | 880 | −1.8 | 4.9 | 5.0 | 54.5 |
| 6 | 65 | 55 | 6 | 6 | 65 | 851 | 880 | −3.4 | 4.8 | 5.0 | 54.5 |

This data shows a significant decrease in prevailing torque with reuse. This is an expected result with locking inserts. As in the previous data, the preload drops with reuse due to an increase in friction at the thread interface and bolt head face as indicated by the increase in computed primary locking.

The self-loosening computed with measured preload after retightening compares well with the self-loosening computed with torque difference. This is evidence of the validity of the concept of using one-half the tightening minus removal torque for determining self-loosening for bolts, even with locking inserts and reuse.

The preload determined with thread pitch and torque difference also compares well with the measured preload $$\frac{1}{2}(T_t - T_r) = \frac{1}{2}(75 - 58) = 8.5 \text{ in} \cdot \text{lb} \qquad (15)$$

$$\frac{F_p p}{2\pi} = \frac{(1332)(1/28)}{2\pi} = 7.6 \text{ in} \cdot \text{lb}$$

From Equation 10, the primary locking is computed as $$F_p\left(\frac{\mu_t r_t}{\cos\beta} + \mu_n r_n\right) = \frac{1}{2}(T_t + T_r) - T_{pv} = \frac{1}{2}(75 + 58) - 15 = 51.5 \text{ in} \cdot \text{lb} \qquad (16)$$

Similar data was obtained for the other tested fasteners. The examples presented above are representative and show reduced uncertainty in preload from torque difference versus just tightening torque alone. However, tests with the stainless steel AN4C14A bolts and AN363C428 all-metal locknuts resulted in severe galling and seizing during the initial use and were not tested further.

As noted above, the fasteners were tested in their as-received condition with no cleaning performed or lubricant added. Since the addition of lubricant to the threads and nut face (or bolt face for use with inserts) improves repeatability and reduces uncertainty in preload in torque-tension data, it is expected that the addition of lubricant will further reduce the uncertainty in the computed preload from the torque difference.

Practical Applications

As described above, the disclosed approach provides a way to achieve a desired or "target" preload from nothing more than thread pitch, tightening torque, and removal torque. No additional information or previous data is needed. The tightening torque and removal torque can be measured with a torque tool, such as a common torque wrench, at the point of use.

Consider another example. Given a torque wrench and threaded fasteners in the form of a nut (a first fastener element) and bolt (a second fastener element) both having a thread pitch of 1/28", it is desired to achieve a target preload of 900 lb in a given application. The target preload could be achieved through knowledge of the thread pitch and by applying trial values of tightening torque, measuring the associated removal torque, and computing the preload using Equation 5. Once a trial tightening torque value is identified that approximates the target preload, that torque value can be used as the tightening torque that is ultimately applied to the nut in the given application. Table 5 illustrates actual data using this process. As shown in that table, an initial trial tightening torque of 20 in-lb was applied to a nut. This resulted in a removal torque of 16 in-lb and a computed preload of 352 lb. The trial tightening torque was then incrementally increased until a preload that approximates the target preload was achieved. The results in Table 5 indicate that a tightening torque of 52 in-lb should provide a preload of approximately 900 lb. The actual preload was then measured and was within a few percent of that value.

TABLE 5

Preload from only thread pitch, tightening torque, and removal torque.

| $T_t$ (in-lb) | $T_r$ (in-lb) | $\pi (T_t - T_r)/p$ (lb) |
|---|---|---|
| 20 | 16 | 352 |
| 30 | 24 | 528 |
| 40 | 32 | 703 |
| 50 | 40 | 879 |
| 60 | 49 | 967 |

As described above, however, the required tightening torque can be determined more quickly using the trial 20 in-lb tightening torque, the trial 352 lb preload achieved with the trial 20 in-lb tightening torque, and the target preload of 900 lb. A simple ratio of $T_t/T_{t\ trial}=F_p/F_{p\ trial}$ yields $$T_t = \frac{T_{ttrial}F_p}{F_{ptrial}} = \frac{pT_{ttrial}F_p}{iT(T_{ttrial} - T_{rtrial})} \quad (17)$$

When the thread pitch, the trial tightening torque of 20 in-lb, the trial removal torque of 16 in-lb, and the target preload of 900 lb are input into Equation 17, the required tightening torque can be computed as $(0.0357)(20)(900)/\pi$ $(20-16)=51$ in-lb. If that tightening torque is applied (the "required tightening torque," i.e., the tightening torque required to achieve the target preload), the target preload will be achieved within a few percent. Therefore, the entire process simply involves: (1) applying and measuring a trial tightening torque, (2) applying and measuring a removal torque, and (3) calculating the required tightening torque using Equation 17 based upon the thread pitch and the target preload, and (4) applying the required tightening torque to the threaded fastener achieve the target preload.

This approach is viable even if the trial tightening torque is higher than the required tightening torque. For example, using the data in Table 5, if the trial tightening torque was 60 in-lb, the measured removal torque would be 49 in-lb and the computed trial preload would be 967 lb. Using Equation 17, the tightening torque required for the target preload is (60)(900)/967=56 in-lb, which achieves the target preload within a few percent.

Figure 9:
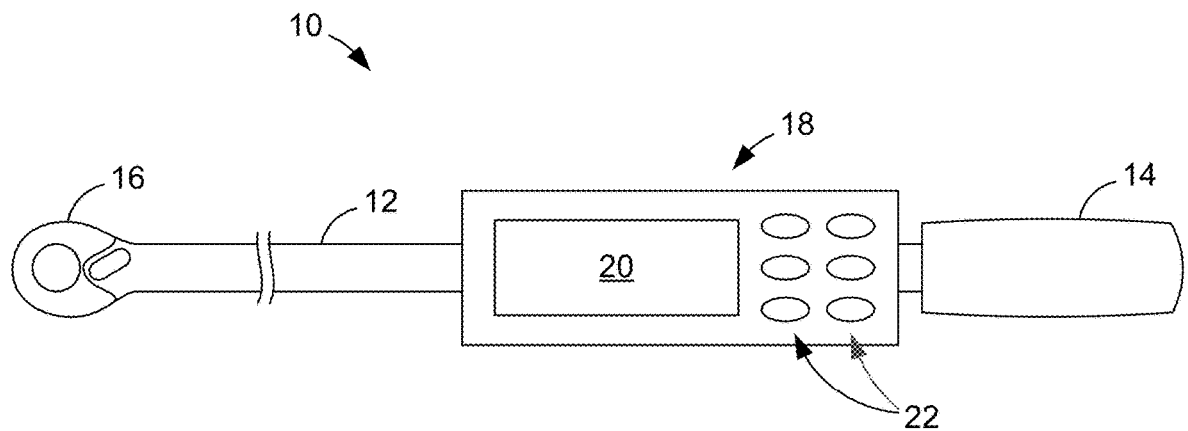
FIG. 9 is a schematic view of an embodiment of a torque wrench configured to assist the user in achieving a target joint preload.

FIG. 9 illustrates an example embodiment of a torque tool 10, in the form of a torque wrench, that can be used in situations such as those described above. As shown in the figure, the torque wrench 10 includes an elongated shaft 12 having a handle 14 at one end and a head 16 at the other end that is adapted to receive sockets that can be used to tighten and loosen nuts and bolts. By way of example, the sockets are configured to tighten and loosen "hex" nuts and bolts having a hexagonal outer peripheries or heads. Mounted to the shaft 12 is a computing device 18 that includes a display 20 and one or more buttons 22 configured for user interfacing with the device. Torque measurements made with the torque wrench 10 can be displayed in the display and stored in memory (see FIG. 10) for use in calculating the required tightening torque. The buttons 22 can be used to make selections and input information, such as thread pitches and target preloads.

Figure 10:
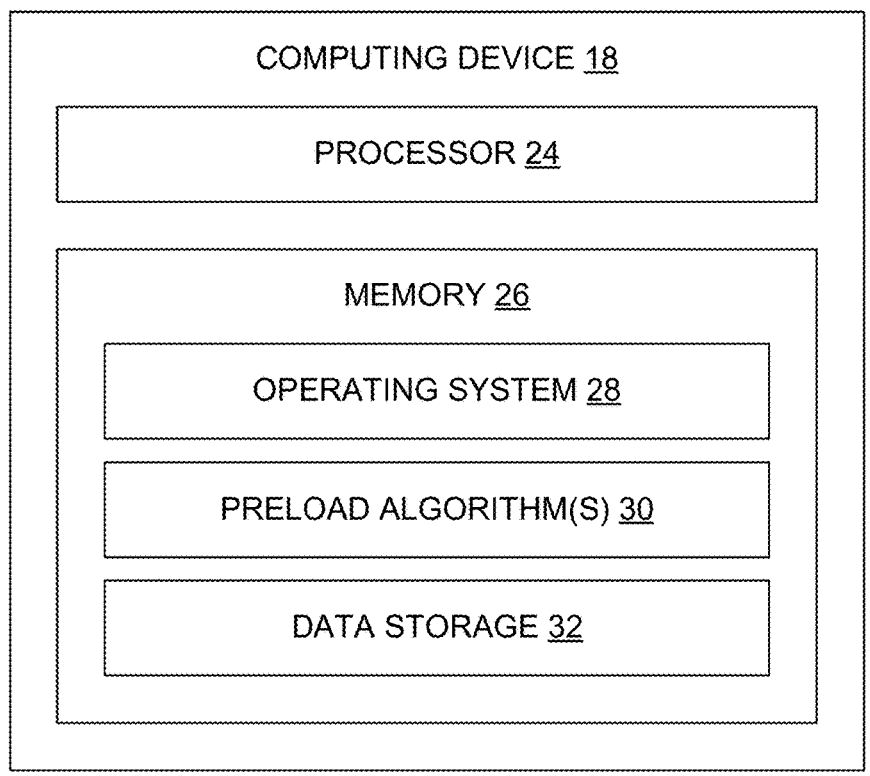
FIG. 10 is a schematic view illustrating an embodiment of a configuration for a computing device of the torque wrench of FIG. 9.

FIG. 10 shows an example embodiment for the computing device 18 of the torque wrench 10 of FIG. 9. As shown in this figure, the device 18 includes a processor 24 and memory 26 (a non-transitory computer-readable medium). It is noted that, while these two components are shown as independent components, in some embodiments the processor 24 and memory 26 can be integrated into a single element, such as a microprocessor or microcontroller chip (see FIG. 11). Irrespective of the particular configuration that is used, the memory 26 stores a rudimentary operating system 28, one or more preload algorithms 30, and data storage 32. The preload algorithms 28, which comprise computer-executable instructions, can be executed by the processor 24 to apply one or more of the equations described above (such as Equation 5 and/or Equation 17) to estimate various parameters, such as preload and required tightening torque.

As a use example, a user can input the pitch of a bolt on which a nut is to be tightened as well as a target preload using the buttons 22 (alternatively, the display 20 can be a touch display with "soft" buttons). The torque wrench 10 can then be used to apply both a trial tightening torque and a trial removal torque to the nut threaded on the bolt. As this is performed, the trial tightening torque and the trial removal torque are measured and stored in memory 26. The computing device 18 can then calculate the tightening torque required to achieve the target preload and display it for the user in the display 20. The user can then tighten the nut to the required tightening torque computed by the torque wrench 10.

Variations and Technique

The disclosed approach is a significant improvement over the existing method of using only tightening torque, requires no previously acquired torque-tension data, and calculates preload and/or required tightening torque with reduced uncertainty. Additional expensive tools, training, and preparation are not needed as with other existing methods based on turn-angle or bolt stretch. Other than thread pitch, no previous knowledge, data, or preparation is required. Significantly, because the approach is based on trial tightening toque minus trial removal torque measurements at the point of installation, it inherently accommodates variations in thread interface and nut or bolt face conditions, including the state of coatings, cleanliness, and lubricant.

Similarly, the disclosed approach accommodates variations in technique with the torque wrench. For example, some technicians prefer to apply torque slowly and hold at the tightening torque, while others promote a more rapid application of torque. Such differences can make a significant difference if one is only using tightening torque based on previously obtained torque-tension data. The technician or user at installation needs to be aware of which technique was used in obtaining the torque-tension data. With the disclosed approach, the application of torque should be as consistent as possible for trial tightening torque and trial removal torque measurements. A slow, steady application of torque for tightening with a two-second hold at tightening torque is recommended and was used in the above-described testing. Too rapid application of tightening torque may result in lower friction as compared to the friction associated with the removal torque. Any difference in friction between tightening and removal likely accounts for most of the uncertainty in using this new approach to achieve preload.

Figure 11:
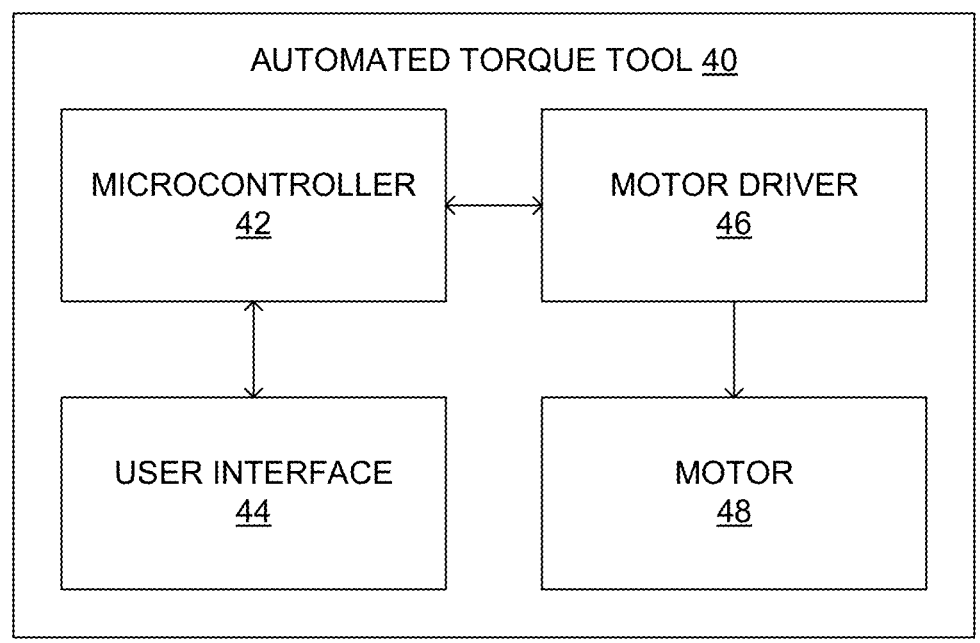
FIG. 11 is a block diagram of an embodiment of an automated torque tool configured to automatically apply torque to a fastener.

Automated Embodiments:

In some embodiments, an automated torque tool can be configured to automatically apply and measure the trial tightening torque, the trial removal torque, and the required tightening torque that achieves the target preload. FIG. 11 schematically illustrates an example configuration for such an automated torque tool 40. As shown in this figure, the tool 40 can include (among other things) a microcontroller 42 that functions similarly to the processor 24 and memory 26, a user interface 44 the functions similarly to that of the torque wrench, as well as a motor 48 and a motor driver 46 that is used to control the motor under control of the microcontroller 42. In operation, the motor 48 can be used to drive (apply torque to) a threaded fastener instead of a human user. Advantages of an automated torque tool include an even further reduction of uncertainty in the target preload by removing user technique in torque application and increased simplicity of use.

The invention claimed is:

1. A method for determining a joint preload, the method comprising:
    identifying a thread pitch of a first fastener element to be used to secure two components together;
    passing the first fastener element through the two components;
    threading a second fastener element onto the first fastener element until the second fastener element contacts one of the two components;
    applying a tightening torque to the second fastener element and measuring that torque as the tightening torque;
    applying a loosening torque to the second fastener element and measuring that torque as a removal torque; and
    computing the joint preload using only the thread pitch, the tightening torque, and the removal torque,
    wherein computing the joint preload comprises applying a following equation:

$$F_p = \frac{\pi}{p}(T_t - T_r)$$

wherein $F_p$ is the joint preload, p is the thread pitch, $T_t$ is the tightening torque, and $T_r$ is the removal torque.

2. The method of claim 1, wherein the first fastener element is a threaded bolt and the second fastener element is a threaded nut.

3. The method of claim 1, wherein the tightening torque and the removal torque are applied using a torque tool.

4. The method of claim 3, wherein the torque tool is a torque wrench.

5. The method of claim 3, wherein the torque tool is an automated torque tool having a motor configured to automatically apply the tightening torque and the removal torque.

6. The method of claim 3, wherein identifying a thread pitch comprises entering the thread pitch into a computing device associated with the torque tool.

7. The method of claim 6, wherein measuring the tightening torque and the removal torque comprise measuring those torques with the torque tool.

8. The method of claim 6, further comprising storing the thread pitch, the tightening torque, and the removal torque with the computing device.

9. The method of claim 8, wherein the computing device presents the joint preload to a user.

* * * * *